April 25, 1939. V. W. KLIESRATH 2,156,118
SERVOMOTOR AND CONTROL FOR TRANSMISSIONS
Filed March 21, 1936 7 Sheets-Sheet 1

INVENTOR.
VICTOR W. KLIESRATH
BY H. O. Clayton
ATTORNEY

April 25, 1939.  V. W. KLIESRATH  2,156,118
SERVOMOTOR AND CONTROL FOR TRANSMISSIONS
Filed March 21, 1936   7 Sheets-Sheet 3

INVENTOR.
VICTOR W. KLIESRATH
BY
ATTORNEY

April 25, 1939.  V. W. KLIESRATH  2,156,118
SERVOMOTOR AND CONTROL FOR TRANSMISSIONS
Filed March 21, 1936   7 Sheets-Sheet 4
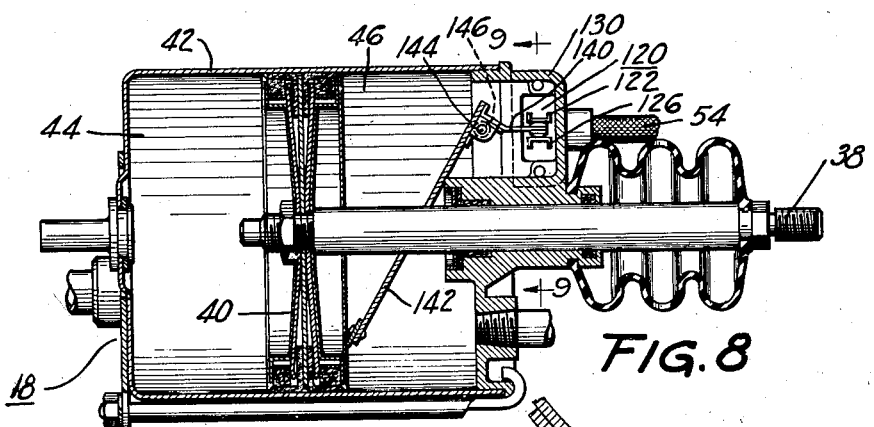
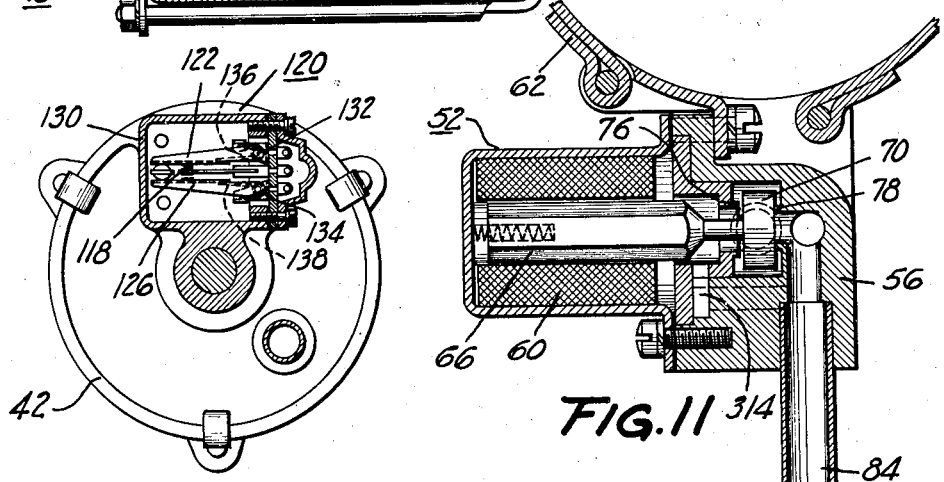
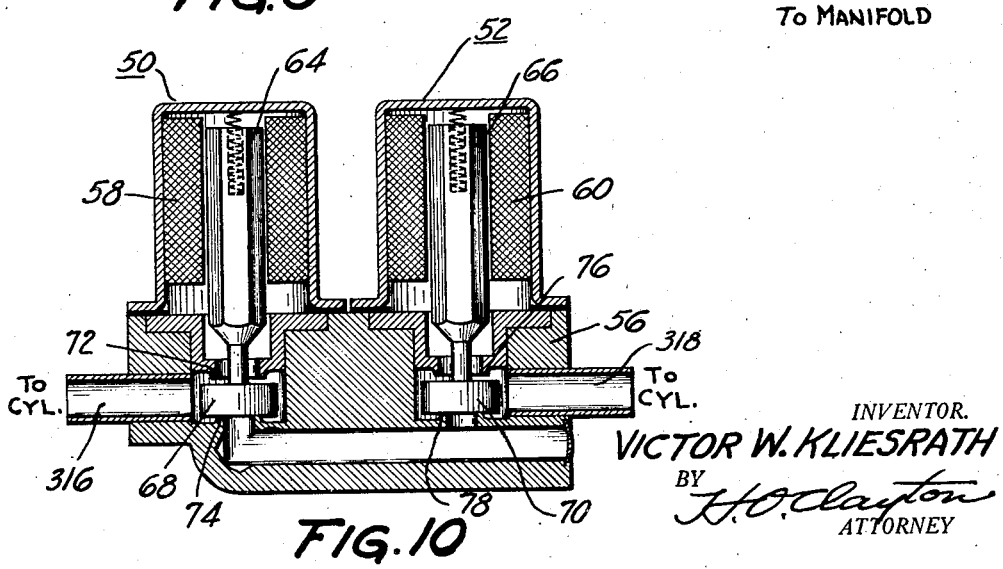
INVENTOR.
VICTOR W. KLIESRATH
BY
ATTORNEY

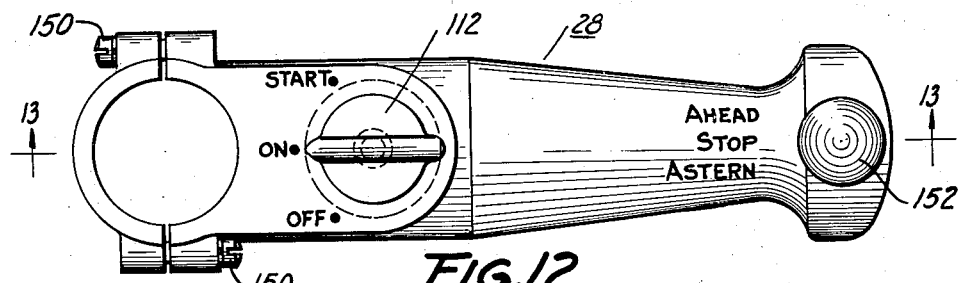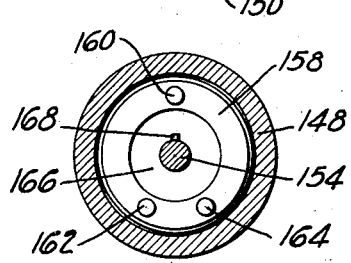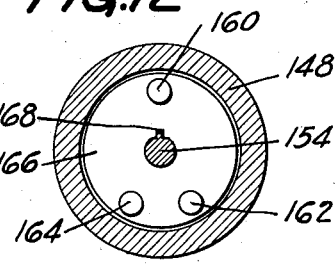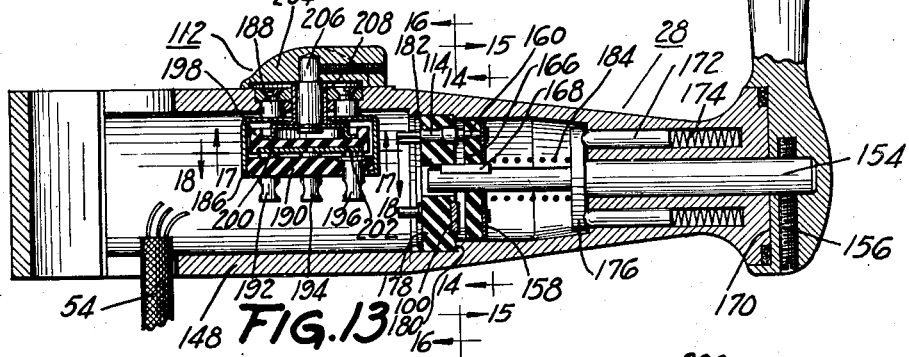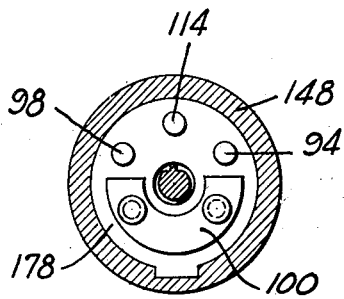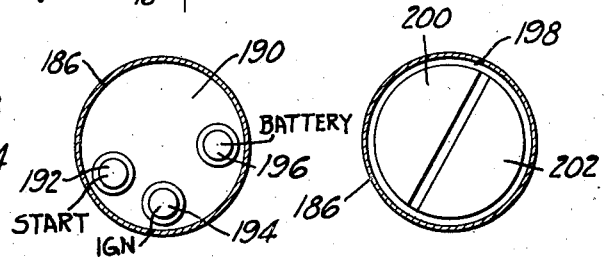

April 25, 1939.  V. W. KLIESRATH  2,156,118
SERVOMOTOR AND CONTROL FOR TRANSMISSIONS
Filed March 21, 1936  7 Sheets-Sheet 7
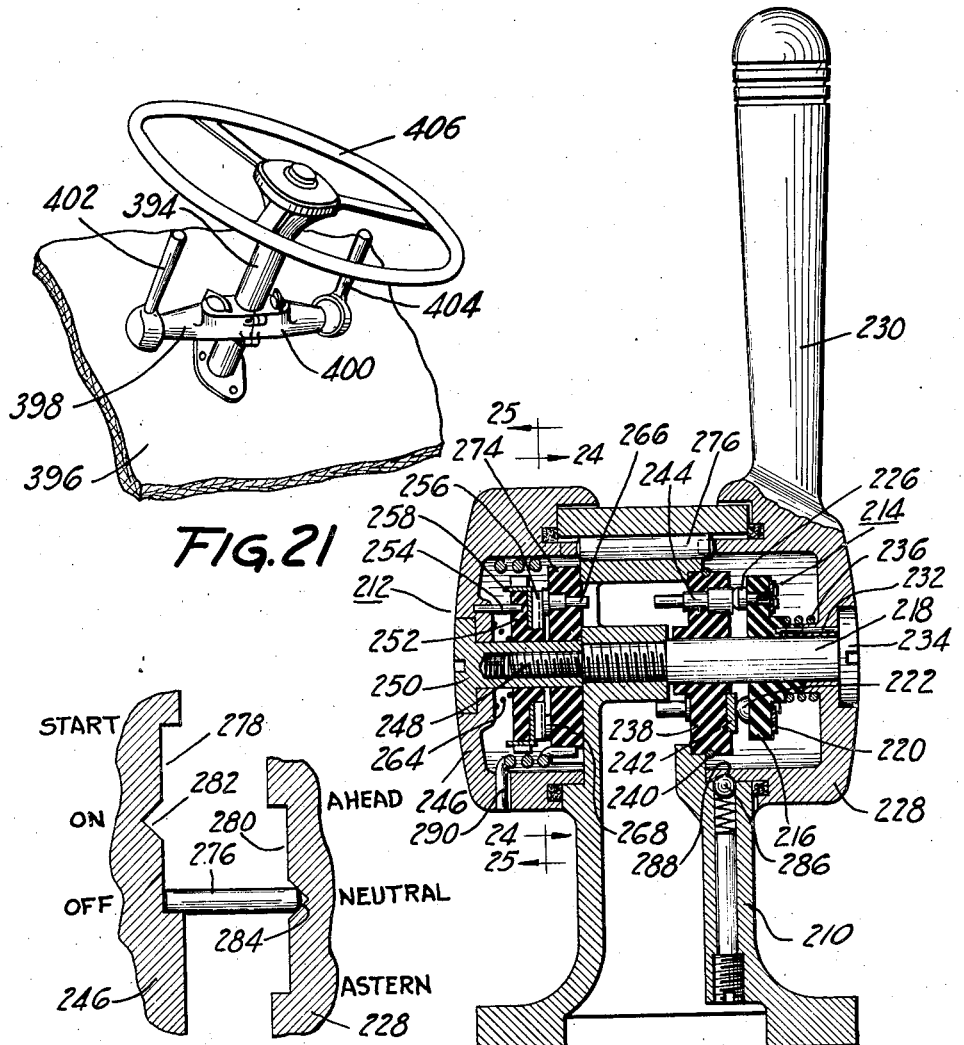
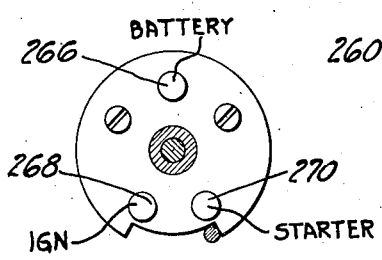
INVENTOR.
VICTOR W. KLIESRATH
BY
ATTORNEY Patented Apr. 25, 1939

2,156,118

UNITED STATES PATENT OFFICE 2,156,118

SERVOMOTOR AND CONTROL FOR TRANSMISSIONS

Victor W. Kliesrath, South Bend, Ind., assignor to Bendix Products Corporation, South Bend, Ind., a corporation of Indiana Application March 21, 1936, Serial No. 70,008

4 Claims. (Cl. 121—38)

This invention relates in general to means for operating the transmission mechanism or so-called reverse gear of marine craft and in particular to remotely controlled power means for operating said transmission.

The increasing weight of such craft and the demand that top speeds of propulsion be increased have necessitated transmission mechanism, the manual operation of which is exceedingly difficult. For example, with such a transmission the clutch springs must necessarily be quite heavy and the lubricating oil of relatively high viscosity. It is accordingly the principal object of this invention to provide power means for operating the transmission requiring a minimum of skill and a minimum of physical effort to operate.

The invention also contemplates the provision of a transmission operating power means functioning in a manner which fully simulates a conventional manual operation of the transmission. To this end there is provided a miniature or dummy shift lever easily accessible to the pilot adjacent the steering wheel, a forward movement of said lever effecting a forward or ahead operation of the transmission to propel the craft forwardly, a rearward movement of the lever effecting a reverse or astern operation of the transmission to propel the craft rearwardly, and a neutral position of the lever neutralizing the transmission to disconnect or unload the engine from the propeller shaft.

A further object of the invention is to provide a power operated propeller shaft brake operable, when and only when the aforementioned control lever is placed in its neutral position, to obviate any driving movement of the shaft.

Yet another object of the invention is to provide a remotely controlled transmission operating power means of the electro-pneumatic type, said means having five operative positions—a position to propel the craft ahead, two positions to maneuver the craft, i. e., in docking the same, a position to neutralize the transmission, and, lastly, a position to reverse the direction of the craft.

Another object of the invention is to provide a pressure differential operated motor operatively connected to the transmission or reverse gear, said motor being in part controlled by two three-way valves, one connected with each end of the motor. The three-way valves are operated by solenoids, the latter being controlled by a master or pilot selector switch and by a selector switch operated by the power element of the motor, said switches being so wired to the solenoids and to each other as to make possible, through the intermediary of the two valves, the aforementioned operation of the transmission.

A further object of the invention is to provide a compact control switch mechanism including means so interlocking the aforementioned pilot selector switch and a combined ignition and starter selector switch as to make possible an operation of the latter switch only when the pilot selector switch is in its neutral position.

Other features of the invention, including novel combinations and subcombinations of parts and details of construction, such as the construction of the combined ignition, starter and selector switches, will be made apparent from the following detailed description, taken in conjunction with the accompanying drawings, in which:

Figure 8 is a vertical sectional view of the motor shown in Figure 7;

Figure 9 is a sectional view, taken on the line 9—9 of Figure 8, disclosing details of the motor operating neutral switch;

Figure 7:
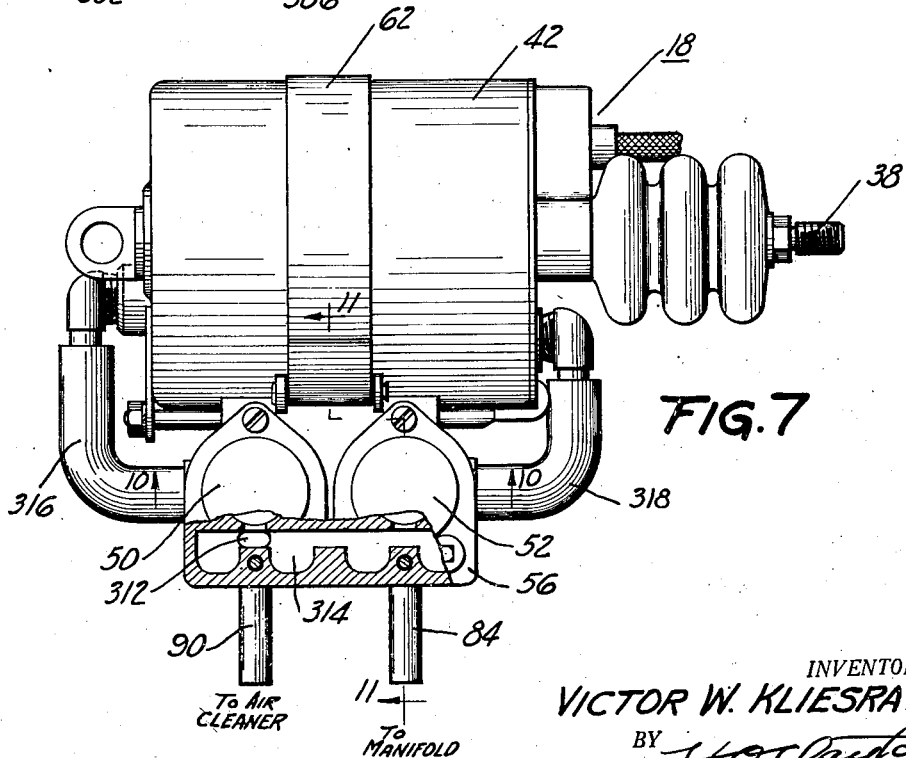
Figure 7 is a plan view of a preferred form of the transmission operating pressure differential operated motor of my invention.
Figure 19:
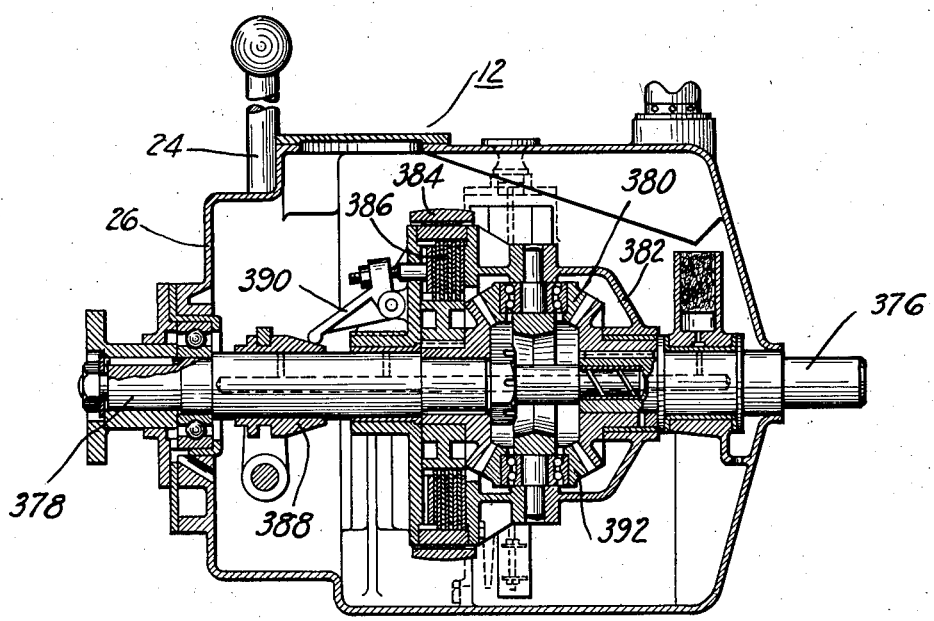
Figure 20:
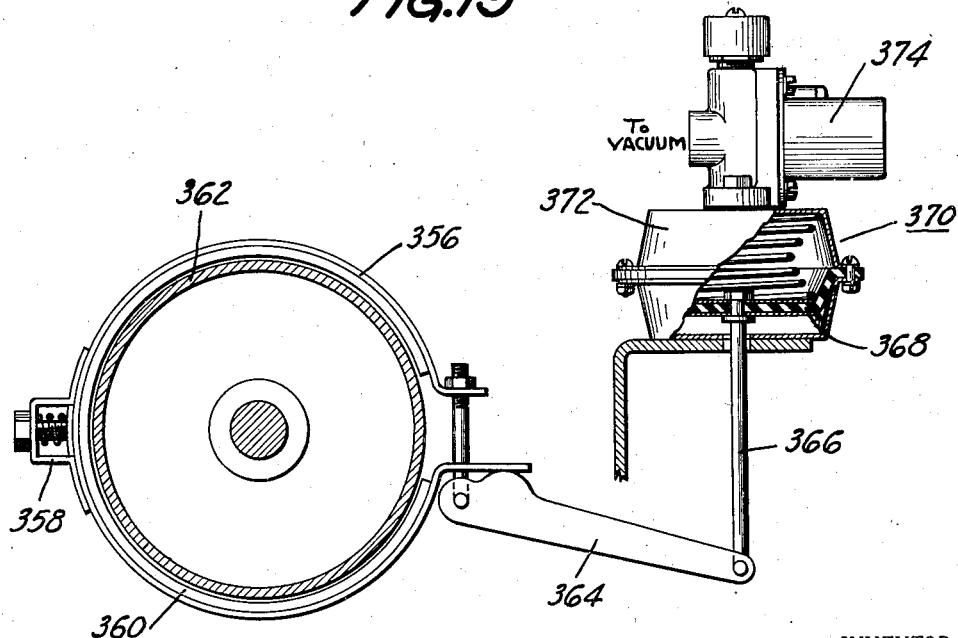

Figures 10 and 11 are other sectional views of the transmission operating motor, said views being taken on the lines 10—10 and 11—11 of Figure 7;

Figure 12 is a plan view of the selector switch mechanism of my invention;

Figure 13 is a longitudinal sectional view of the selector switch of Figure 12, said view being taken on the line 13—13 of Figure 12;

Figures 14, 15, 16, 17 and 18 are various sectional views of the switch mechanism, said views being taken respectively on the lines 14—14, 15—15, 16—16, 17—17 and 18—18 of Figure 13;

Figure 19 is a sectional view disclosing the details of a conventional reverse gear transmission for marine craft;

Figure 20 is a view disclosing, in detail, the preferred form of propeller shaft brake mechanism of my invention;

Figure 21 discloses a control switch mechanism for a twin engine power plant;

Figure 22 is an enlarged sectional view of a pedestal type of control switch mechanism, said mechanism including an interlock between a combined ignition and starter switch and the selector switch for the transmission operating power means;

Figure 23 is a fragmentary developed view disclosing, in detail, the interlocked mechanism of Figure 22; and Figures 24 and 25 are sectional views of the combined starter and ignition switch of Figure 22, said views being taken on the lines 24—24 and 25—25 of Figure 22.

Figure 1:
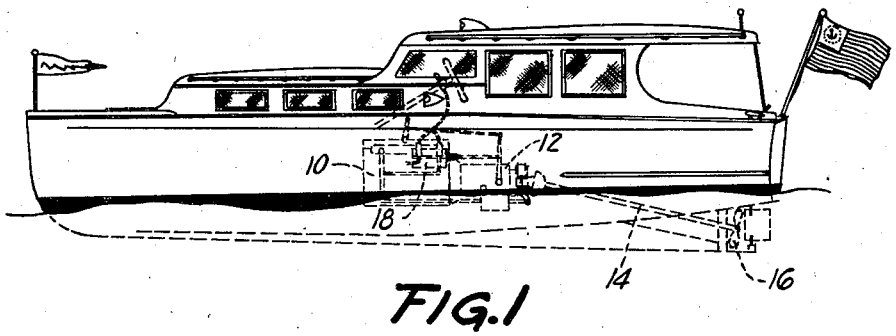
Figure 1 is a side elevation of a conventional marine craft, the transmission operating power means of my invention being disclosed in dotted lines.
Figure 2:
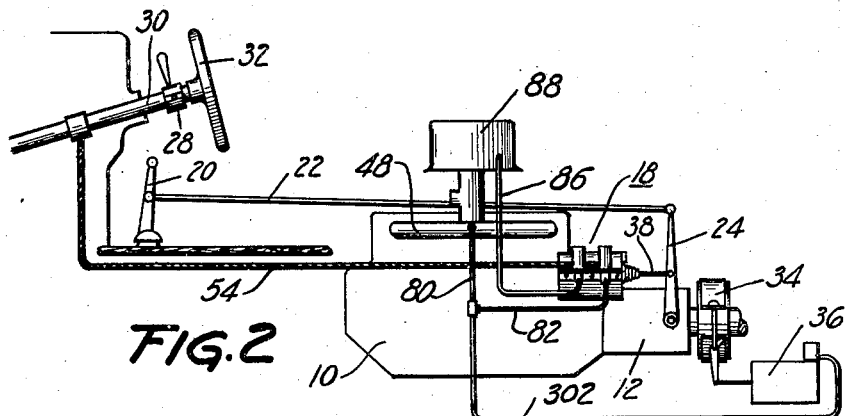
Figure 2 is a diagrammatic view, in side elevation, of the principal elements of the power means constituting my invention.

As disclosed in Figure 1, the major elements of the power plant, including an engine 10, a reverse gear or transmission 12, a propeller shaft 14, propeller 16 and reverse gear operating power means 18, are located amidships of the craft. Referring to Figure 2 for other elements of the reverse gear operating means, there is disclosed a manually operable shift lever 20 positioned conveniently near the pilot's seat and operably connected by link 22 to a shift lever 24 extending from a housing 26 of the gear mechanism. A manually operable selector switch 28, mounted on the steering post 30 adjacent the steering wheel 32, and a propeller shaft band brake mechanism 34 operated by a motor 36 complete the principal elements of the invention.

Figure 3:
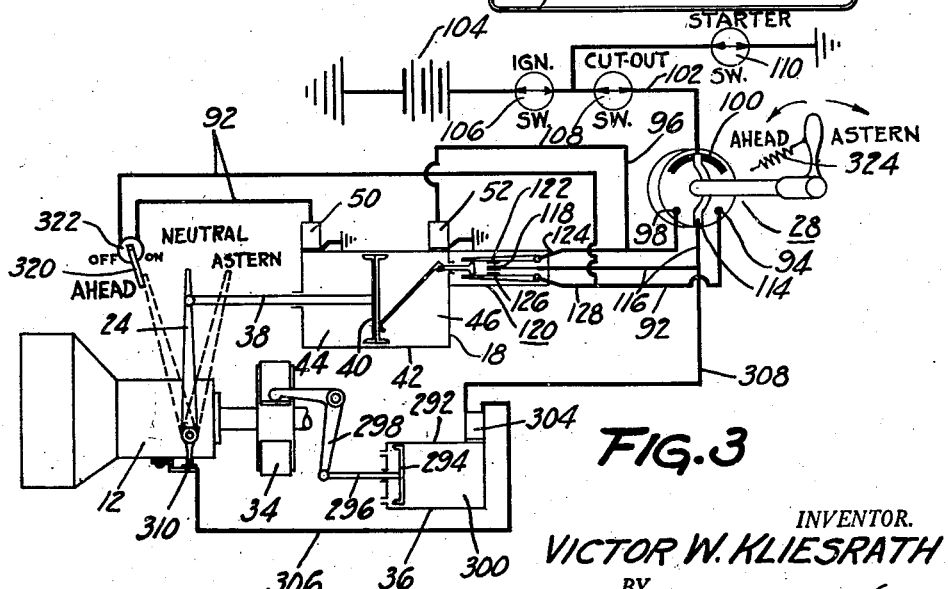
Figure 3 is likewise a diagrammatic view of the elements of the invention with special emphasis laid on the electrical hook-up.

The electro-pneumatic reverse gear operating power means constituting my invention is diagrammatically disclosed in Figures 2 and 3, wherein the gear mechanism 12 is arranged to be operated by the lever 24, the latter being operably connected by a link 38 to a piston 40 reciprocable within a double-ended cylinder 42. The cylinder and piston together constitute a motor, indicated by the numeral 18. End compartments 44 and 46 of the cylinder are adapted, as will be more fully described hereinafter, to be alternately connected to a source of vacuum, preferably an intake manifold 48, and to the atmosphere by means of power operated three-way valves 50 and 52. The gear operating motor 18 is successively energized to selectively position the reverse gear mechanism in any one of its ahead, neutral or astern positions, as indicated by the several positions of the lever 24 in Figure 3. The valves 50 and 52 are preferably solenoid operated, wiring 54, Figure 2, interconnecting the solenoids with the aforementioned selector switch 28.

There are disclosed in Figures 7 to 11 the details of the motor 18 of the power mechanism. As shown in Figures 7, 10 and 11, the valve mechanism comprises a casing 56 to which are secured solenoids 58 and 60. The casing is preferably detachably secured to the cylinder 42 by means of a band 62, as disclosed in Figures 7 and 11. To armatures 64 and 66 of the solenoids are secured valve members 68 and 70, the member 68 being adapted to seat at 72 and 74 and the member 70 at 76 and 78 to alternately connect the motor unit with the vacuum or atmosphere. Briefly describing the pneumatic connections, conduits 80 and 82 serve to interconnect the intake manifold 48 of the engine 10 with a conduit 84, Figures 7 and 11, and a conduit 86 serves to interconnect an air cleaner 88 with conduit 90, Figure 7.

Describing the electrical hook-up, Figure 3, solenoid 60 is connected, by wiring 92, with a contact 94 of the selector switch 28, solenoid 58 is connected, by wiring 96, with contact 98 of the selector switch, and a contact 100 of the switch is connected, by hot wire 102, to a battery 104, ignition and cut-out switches 106 and 108 being interposed in series in this connection. A starter switch 110 is also incorporated in the circuit, being connected, as disclosed in Figure 3, between the ignition and cut-out switches. The ignition and starter switches are combined as one switch mechanism 112, as more fully described hereinafter. A neutral contact 114 of the switch 28 is connected, by wiring 116, to a common contact 118 of a so-called neutral switch mechanism 120, one contact 122 of the latter being connected, by wiring 124, to the wiring 96, and another contact 126 of the switch 120 being connected, by wiring 128, to the wiring 92.

Figures 8 and 9 disclose the details of the motor unit 18 and neutral switch 120, the latter comprising a casing 130 preferably built into the cylinder 42 and housing the aforementioned contacts 122 and 126 which are pivotally secured to the casing at 132 and 134 respectively. The contacts are biased by springs 136 and 138 into engagement with the contact 118 but are normally held spaced from said contact by an end portion 140 of a lever 142, pivoted within the cylinder at 144. The lever is preferably biased, by a spring 146, to a position to permit contact 122 to engage contact 118.

Referring to Figures 12 to 18, inclusive, for a detailed disclosure of the selector switch mechanism 28, there is provided a tubular casing 148 adapted to be secured to the steering post 30 by bolts 150. A manually operable handle member 152 is secured to a two-diametered pin 154 by bolt 156 and the aforementioned combined ignition and starting motor switch 112 is built into the casing 148. A conductor ring 158, Figure 14, is secured by contact pins 160, 162 and 164 to a disk 166 of insulating material, the latter being keyed at 168 to the pin 154. The handle 152 is urged into contact with the casing 148 at its bearing 170 by means of pins 172, urged by springs 174 into engagement with a collar 176 rigidly secured to the pin 154. The contact pins 162 and 164 are adapted to slidably contact the aforementioned contact 100 secured to a disk 178 of insulating material, the latter being rigidly secured to the casing 148 by means of a shoulder 180 in the casing and a locking ring 182.

The contact pin 160 is contactible with the three aforementioned contacts 94, 98 and 114, the latter being embedded within the disk 178 and wired to the solenoids 58 and 60 and neutral switch 120, as previously described. The disk 166 and its contacts are biased into contact with the contacts in the disk 178 by means of a spring 184 interposed between the disk 166 and the collar 176. The showing of the switch in Figure 3 is, of course, merely diagrammatic and does not therefore agree in detail with the mechanism of Figures 12 to 16.

Describing now the details of the starter and ignition switch 112, a casing 186 is permanently secured, by rivets 188, to the switch casing 148. Within the casing 186 there is rigidly secured a disk 190 of insulating material in which is embedded three contact members 192, 194 and 196 connected respectively to the starting motor for the engine, to the ignition and to the battery 104, or other source of electrical power. Within a second disk 198 of insulating material are embedded contacts 200 and 202, and the disk 198 is rotated by means of a handle 204 secured to a post 206, the latter connected to a stamping 208 secured to the disk.

There is disclosed in Figures 22 to 25, inclusive, an alternative form of control switch mechanism, wherein the starter and ignition switch unit is interlocked with the selector switch for controlling the reverse gear operating power means. This mechanism comprises a hollow pedestal type of casing 210 housing a combined starting motor and ignition switch unit 212 and a selector switch unit 214. The later unit comprises an insulator disk 216 rotatably mounted on a pin 218. Within the disk is embedded a ring 220 and contacts 222, 224 (not shown) and 226, similar to the construction of the switch of Figure 13. The disk 216 is keyed to a cup-shaped base portion 228 of a manually operated control member 230 by pins 232, the member 230 being rotatably mounted on the pin 218 and secured to the later by set screw 234. A spring 236 serves to bias the member 216 and its contacts into engagement with a second insulator disk 238 rigidly secured to the casing 210 by ring 240, in which disk is embedded a contact 242 wired to a battery and three contacts 244 wired to the solenoids and neutral switch, as previously described.

The switch unit 212 is positioned within a cup-shaped housing member 246 detachably secured to a threaded end 248 of the pin 218 by means of a set screw 250. A disk 252 of insulating material is keyed to the member 246 by pins 254 and a stamping 256 is secured to the member 252 by tabs 258. The stamping constitutes a contact member being provided with raised portions 260 and 262 adapted to be urged, by a spring 264, into contact with contact members 266, 268 and 270, embedded within a disk 274 of insulating material and connected respectively to the battery, to the ignition switch and to the starting motor switch, all as previously described.

An important feature of the invention, aside from the compactness of the switch mechanism just described, lies in an interlock mechanism between the two switches 212 and 214. This construction comprises a pin 276, Figure 23, nested between the members 246 and 228, the latter being provided with recesses 278 and 280 respectively, the recesses being provided with indents 282 and 284. As to the functioning of the interlock, as will be obvious from an inspection of Figure 23, when and only when the selector switch 214 is in its neutral position may the ignition and starter switch unit 212 be operated to close either the ignition or starting motor circuits. A fool-proof mechanism is thus provided, preventing the engine from being started while the transmission is in gear.

It is furthermore obvious that the selector switch 214 may not be operated until the ignition is on, which is an additional advantageous feature of my invention.

A spring operated ball 286, adapted to seat within any one of three detents 288 in the member 228, serves to lock said member in operative position, and a return spring 290 functions to bias the switch 212 to its "ignition on" position from its "starter" position.

A further feature of my invention resides in the provision of a propeller shaft operated brake 34 operable to render the shaft immovable when and only when the transmission is in its neutral position. Creeping of the boat, resulting, for example, from a slipping clutch, is thus obviated. In the embodiment disclosed in Figure 3 there is provided a motor unit 36 comprising a cylinder 292 and piston 294, the former being conveniently secured to the chassis adjacent the propeller shaft and the latter being connected, through the intermediary of a link 296 and lever 298, with a band type brake mechanism 34 operably secured to the propeller shaft to prevent rotation thereof. The compartment 300 of the motor 36 may be evacuated, via a conduit 302 and conduit 80, to energize the motor and apply the brake, with operation of a solenoid operated three-way valve unit 304. The solenoid is connected respectively by wires 306 and 308 to a switch 310 and the neutral contact 114 of the switch 28.

Describing now in brief the operation of the previously described mechanism, the selector switch of Figure 13 or the similar switch of Figure 22 is placed in its neutral position, whereupon the starter and ignition switch is operated to start the engine. Vacuum being created in the intake manifold 48 by virtue of an idling engine, the electro-pneumatic power means may now be operated to place the transmission or so-called reverse gear in its ahead position to move the boat forwardly. The selector switch is then placed in its ahead position to energize the solenoid 58. The armature 64 is accordingly moved upwardly, Figure 10, to seat the valve 68 upon its seat 72, closing off the communication with the atmosphere via conduits 86 and 90, a duct 312 and a recess 314 and interconnecting the manifold 48 with the compartment 44 of the motor unit via conduits 80, 82, 84 and a conduit 316. The compartment 46, of course, remains in communication with the atmosphere, via a conduit 318 and the aforementioned air circuit, and under the load of the atmosphere the piston 40 is then moved to the left, Figure 3, to its ahead position.

In such position the transmission is established to rotate the propeller shaft and move the boat forwardly. According to one feature of the invention, the lever 24, when in its ahead position, contacts a lever 320 of a cut-off switch mechanism 322 to move the latter lever to its off position. The circuit to the solenoid 58 is thus automatically broken to obviate a drain on the battery.

With a movement of the piston 40 to the left, as just described, the spring 146 functions to rotate the lever 142 clockwise, permitting contact 122 to move into contact with contact 118, under the action of spring 136. Thus with the establishment of the ahead position of the transmission, means are automatically brought into operation, by power, to in part establish a circuit between the battery and solenoid 60. Should the operator now desire to neutralize the transmission, he needs but to move the selector switch to its neutral position, thus completing the circuit to energize the solenoid 60. The valve 70 is thus operated to again energize the motor to move the piston 40 and its connected lever 24 back to its neutral position. The operation of the mechanism to establish the astern position of the transmission will be obvious from the aforementioned description together with a disclosure of the drawings.

The solenoid circuit is not cut out in establishing the astern position, practically an equivalent effect, however, being attained by the action of a return spring 324 secured to the levers 152 or 230, for when the operator removes his hand from the lever, after an astern operation of the transmission, the lever is automatically neutralized by the spring to thus neutralize the transmission.

Describing in greater detail the operation of the propeller shaft brake, when and only when the lever 24 is in a neutral position, said lever at its end closes the switch 310 to ground the wire 306, resulting in an operation of the brake motor 36 to apply the brake 34.

Figure 4:
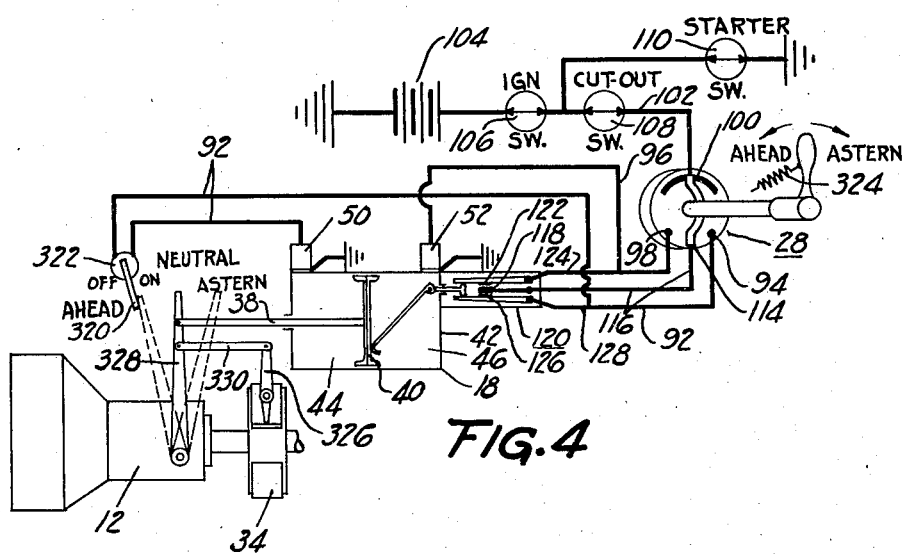
Figures 4 and 5 are views, similar to Figure 3, disclosing modified forms of the invention.

There is disclosed in Figure 4 a modified form of electro-pneumatic transmission operating mechanism, the same being similar to that of Figure 3 with the exception that the propeller shaft brake 34 instead of being operated by power is mechanically operated by a lever 326 connected with a lever 328 by a link 330.

Figure 5:
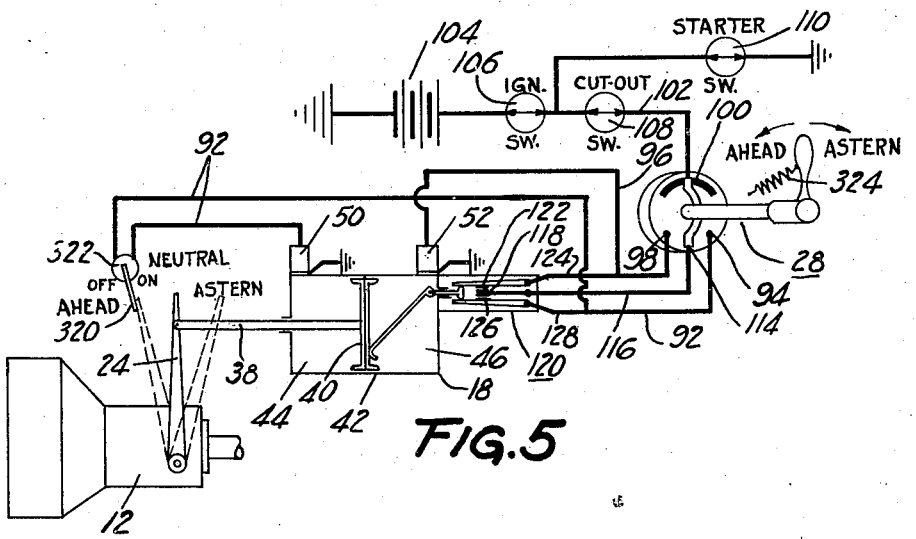

With the modification of Figure 5, the propeller shaft brake is dispensed with.

Figure 6:
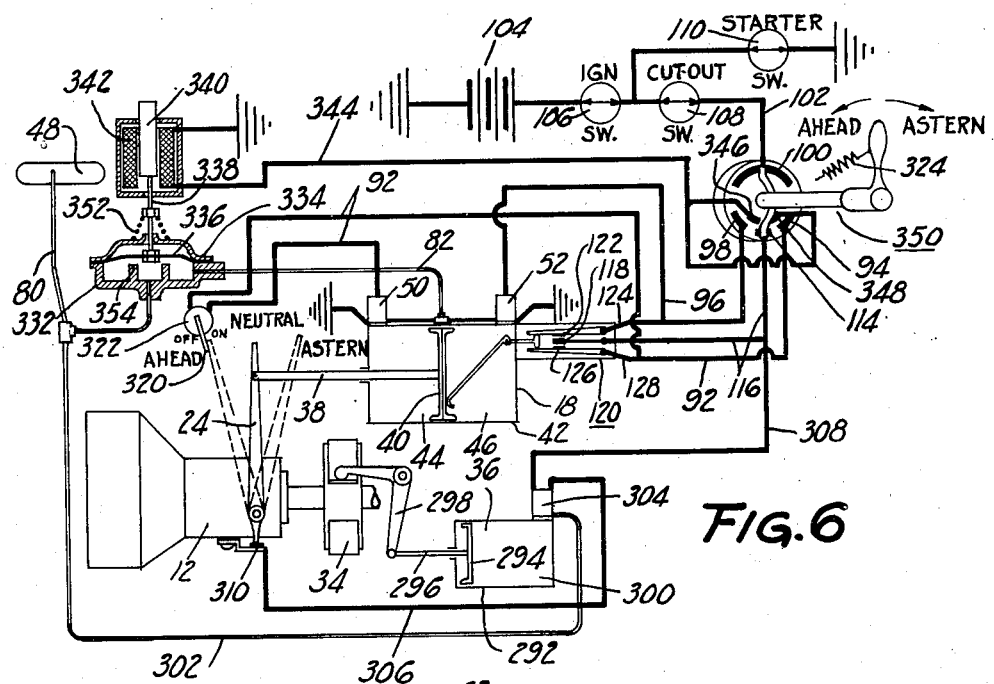
Figure 6 is a further modified form providing, in addition to the mechanism of Figure 3, means for limiting the energization of the power means to effect a maneuvering operation of the transmission.

There is disclosed in Figure 6 a modification of the invention whereby the transmission may be operated to limit the torque transmitted to the propeller shaft, thus providing a means to facilitate a maneuvering or docking of the boat. To this end a solenoid operated choke valve 332 is incorporated in the juncture between the conduits 80, 82 and 302 of the mechanism of Figure 3. The valve comprises a casing 334 housing a diaphragm 336, the latter being connected, by a rod 338, with an armature 340 of a solenoid 342. The solenoid is connected, by wiring 344, to contacts 346 and 348 of a selector switch 350.

Describing the operation of the above-described mechanism, when it is desired to only partly load the clutch of the reverse gear, to thus slip the same and cut either the forward or reverse speed of the boat to a minimum, the operator moves the selector switch to a position to bridge either the contacts 94 and 348 or the contacts 98 and 346. The solenoid 342, together with one or the other of solenoids 58 or 60, is thus energized, the diaphragm 336 of the valve 332 being loaded to counteract, to a degree, the effect of a return spring 352. Then, when the motor 18 and valve 332 have been evacuated to a degree sufficient to permit the spring 352 to seat the diaphragm upon its seat 354, the manifold is automatically cut off from the motor 18 and the piston 40 suspended in its then existing position to effect the aforementioned result.

There is disclosed in Figure 20 an alternative form of brake operating mechanism. In this arrangement a propeller shaft brake, comprising a band 356, an anchor 358 and friction lining 360, is arranged to be applied to a drum surface 362 by a lever 364 and link 366, the latter being connected to a diaphragm 368 of a pressure differential operated motor 370. To the housing 372 of the motor is secured a valve mechanism 374, said mechanism comprising a solenoid operated three-way valve similar in construction to one of the valves of Figure 10.

The transmission or so-called reverse gear unit may be of conventional design; such, for example, as that disclosed in Figure 19. This mechanism comprises a casing 26 housing driving and driven shafts 376 and 378 respectively. The shafts are arranged on a common center and are connected by a bevel gear differential 380. Around a differential cage 382 is a band type brake 384 and within the cage a multiple disk clutch 386 connecting the cage with the output or driven shaft 378. The brake is connected to a control lever 24 by means, not shown, and the lever is connected to the clutch by means of a cone 388 and lever 390.

With the control lever 24 moved into the forward drive position, the clutch is engaged and the external brake is free, so that the shafts 376 and 378 are locked together and the clutch and differential rotate as a unit. When the lever 24 is placed in its neutral position, the clutch and brake are disengaged. Consequently, no torque is transmitted to the driven shaft 378. This shaft is at this time rendered immovable by the brake mechanism heretofore described. When the lever is moved to its astern position, the clutch remains disengaged and the brake 384 is applied, holding the differential cage stationary so that the shaft 378 is driven in reverse through bevel pinions 392 of the differential.

There is disclosed in Figure 21 a switch construction adapted for marine craft provided with two engines. To a steering post 394, protruding from the instrument panel 396, there are secured, in line, two switch casings 398 and 400, each being of similar construction and duplicating the switch disclosed in Figures 12 and 13. The switch control handles 402 and 404 are positioned immediately beneath a steering wheel 406 so as to be readily accessible to the operator.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. Power means for operating the transmission of marine craft comprising a pressure differential operated motor operably connected with the transmission, valve means for controlling the operation of said motor comprising two three-way valves, one mounted on each end of said motor, and means for operating said valve means comprising a solenoid for operating each valve, switch means for controlling the operation of said solenoids comprising a manually operated selector switch operable to effect an energization of either of said solenoids, said switch means further comprising a power operated switch for making possible an energization of one or the other of said solenoids to neutralize the transmission, after the transmission has been established in either its ahead or astern positions, a power operated switch automatically operable, after the ahead setting of the transmission has been established, to deenergize one of the aforementioned solenoids, and power means, automatically operative upon release of the aforementioned manually operable selector switch after the same has been moved into its astern position, to return the selector switch to its neutral position.

2. Power means for operating the transmission of marine craft comprising a pressure differential operated motor operably connected with the transmission, valve operating lever means associated with said motor, valve means for controlling the operation of said motor comprising a plurality of three-way valves, power means for operating said valves comprising a plurality of solenoids, an interlocked selector switch mechanism for controlling the operation of said solenoids comprising a manually operable three-way selector switch operable, depending upon its position, to energize any one of said solenoids to effect either an ahead or an astern operation of the transmission or a neutralization thereof, and further comprising a switch mechanism operable by the aforementioned lever means, and power means, automatically operative upon release of the aforementioned manually operable selector switch after the same has been moved to its astern position, to return the selector switch to its neutral position.

3. Power means for operating the transmission of marine craft comprising a pressure differential operated motor operably connected with the transmission, valve means for controlling the operation of said motor comprising a plurality of three-way valves and a spring and pressure differential operated valve, power means for operating said valves comprising a plurality of solenoids, one for operating each of said valves, and interlocked selector switch mechanism for controlling the operation of said solenoids comprising a manually operable five-way selector switch operable, depending upon its position, to energize at one time a plurality of said solenoids to effect either an ahead or an astern operation of the transmission and a power operated selector switch also operable to condition either one of two of said solenoids to effect a subsequent neutralization of the transmission.

4. Transmission operating power means comprising a motor operatively connected to the transmission and effective to place the same in gear, valve means for controlling the operation of said motor, means for operating said valve means including a manually operable selector, a pressure limiting valve for limiting the degree of pressure actuation of the motor, and means rendered operable by the selector when the latter is placed in a predetermined position for effecting operation of said pressure limiting valve so as to limit the power output of the motor.

VICTOR W. KLIESRATH.